United States Patent
McKee (10) Patent No.: US 11,746,988 B2
(45) Date of Patent: Sep. 5, 2023

(54) PORTABLE ELECTRONICS INTERCHANGEABLE LIGHT COVER

(71) Applicant: Nicole McKee, Hannibal, MO (US)

(72) Inventor: Nicole McKee, Hannibal, MO (US)

(*) Notice: Subject to any disclaimer, the term of this patent is extended or adjusted under 35 U.S.C. 154(b) by 0 days.

(21) Appl. No.: 17/871,548

(22) Filed: Jul. 22, 2022

(65) Prior Publication Data
US 2023/0026950 A1 Jan. 26, 2023

Related U.S. Application Data

(60) Provisional application No. 63/224,471, filed on Jul. 22, 2021.

(51) Int. Cl.
*F21V 9/40* (2018.01)
*F21V 17/00* (2006.01)

(52) U.S. Cl.
CPC .............. *F21V 9/40* (2018.02); *F21V 17/002* (2013.01)

(58) Field of Classification Search
CPC ................................ F21V 9/40; F21V 17/002
See application file for complete search history.

(56) References Cited

U.S. PATENT DOCUMENTS

| | | | | |
|---|---|---|---|---|
| 5,128,850 A * | 7/1992 | Juodvalkis | ............. | G09F 13/04 40/574 |
| 6,582,103 B1 * | 6/2003 | Popovich | ................. | F21V 7/24 361/240 |
| 8,641,214 B1 * | 2/2014 | Batchko | ................ | G02F 1/0107 40/407 |
| 10,201,949 B1 * | 2/2019 | Buck | ......................... | C09J 7/29 |
| 10,217,382 B1 * | 2/2019 | Buck | ......................... | B32B 3/30 |
| 2001/0021110 A1 * | 9/2001 | Nakayama | ............. | G09F 13/14 362/297 |
| 2005/0243541 A1 * | 11/2005 | Sibbett | .................. | F21V 21/088 362/104 |
| 2008/0253140 A1 * | 10/2008 | Fleischmann | ............ | B60Q 1/50 29/832 |
| 2009/0196042 A1 * | 8/2009 | Calmes | .................... | F21S 10/02 362/355 |
| 2011/0007500 A1 * | 1/2011 | Gustaveson | .......... | F21V 21/092 362/183 |
| 2018/0135828 A1 * | 5/2018 | Minsky | .................... | F21V 1/22 |

* cited by examiner

*Primary Examiner* — Bryon T Gyllstrom
(74) *Attorney, Agent, or Firm* — Patterson Intellectual Property Law, P.C.; Mark A. Kilgore (57) ABSTRACT

A colored light filtration apparatus for changing the light color emitted from the light source of cell phones is disclosed herein. The colored light filtration apparatus may include a head portion and a body portion. The head portion of the colored light filtration apparatus may change the light colors once applied over the light source. The body portion of the colored light filtration apparatus may be configured to stick to the cell phone or its case and position the head portion over the light source. The colored light filtration apparatus may be easy to apply and remove in order to create easy swapping of colors. The colored light filtration apparatus may be narrow enough in size to prevent disruption with surrounding cameras and cases of the cell phone.

18 Claims, 6 Drawing Sheets

PORTABLE ELECTRONICS INTERCHANGEABLE LIGHT COVER

CROSS-REFERENCES TO RELATED APPLICATIONS

This application claims benefit of the following patent application(s) which is/are hereby incorporated by reference: U.S. Provisional Application No. 63/224,471 filed on Jul. 22, 2022

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

Field of the Invention

The present invention relates generally to colored filters for lights.

More particularly, this invention pertains to a reusable moldable optically clear colored light filter for use with, for example, cell phone or smart phone lights.

Description of the Prior Art

Colored light filtration is commonplace in film and stage performance. Its application, however, for cell phone lights is extremely limited. Several issues exist which cause the application for cell phone lights to be so limited or nonexistent. Attachment mechanisms similar to those used in stage performance may be too large, require custom phone cases, and/or interfere with a user's current phone case. The applicability and ability to adequately cover the light emitting source may limited by a user's phone case. Though not mentioned here, many other issues may exist with current cell phone light filtration systems.

BRIEF SUMMARY

In view of at least some of the above-referenced problems in conventional and cell phone specific colored light filtration, an exemplary object of the present disclosure is to provide a new and improved colored light filtration apparatus for attachment to a cell phone and/or a cell phone case associated with the cell phone. An exemplary such apparatus may desirably feature a reusable adhesive for coupling the colored light filtration apparatus to the cell phone. The exemplary such apparatus may further feature a moldable material for conforming to the surface of the cell phone or its case. The exemplary such apparatus may further feature a first portion (or head) for covering the light source of the cell phone and a second portion (or body) for releasably coupling to the cell phone or its case. The exemplary such apparatus may further feature indentations defined between the first and second portions. The indentations may help clearly define and separate the first and second portions.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-8, an apparatus 100 for coloring a light source 104 of a cell phone 102 is shown. The cell phone 102, the light source 104, and a case 106 of the cell phone 102 are shown in FIGS. 5-8. The apparatus 100 may include a colored translucent film 110 and a coupling means 130 for coupling the colored translucent film 110 to one of the cell phone 102 or the case 106 of the cell phone 102. The apparatus 100 may also be referred to herein as a colored light filtration apparatus 100.

The colored translucent film 110 may include a first portion 112 and a second portion 114. The first portion 112 may be configured to cover the light source 104 of the cell phone 102. The second portion 114 may be configured to be coupled to the cell phone 102 or the case 106 of the cell phone 102 adjacent to the light source 104 such that the first portion 112 covers the light source 104. The cell phone 102 may also be referred to herein as a smart phone 102. In some embodiments, both the first portion 112 and second portion 114 are configured to couple to the cell phone or the case of the cell phone.

Figure 1:
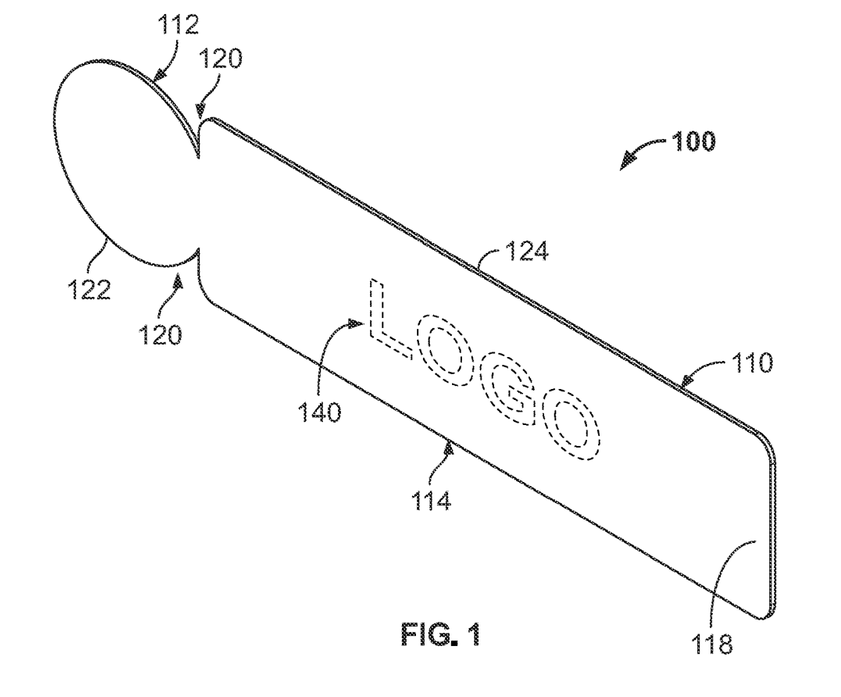
FIG. 1 is a perspective view of an embodiment of a colored light filtration apparatus in accordance with the present disclosure.
Figure 2:
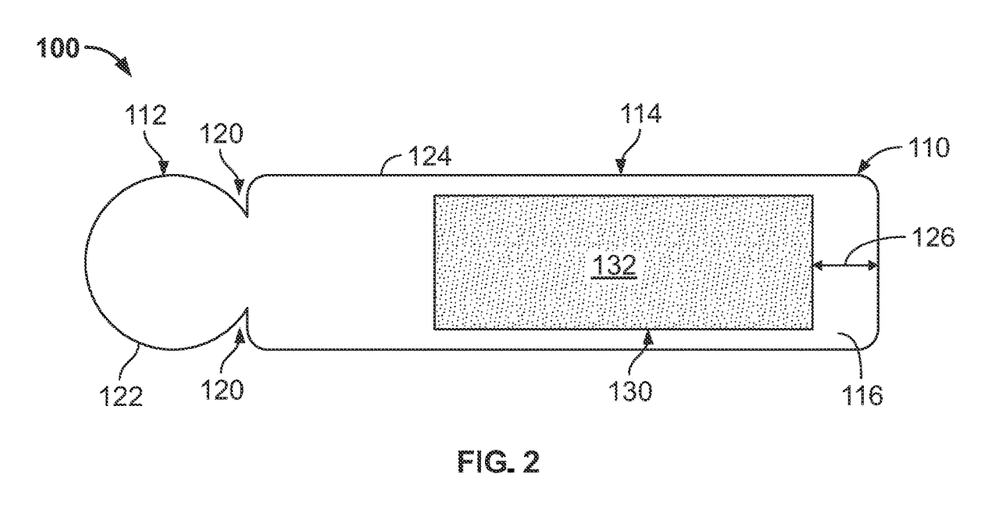
FIG. 2 is a bottom plan view of the colored light filtration apparatus of FIG. 1 in accordance with the present disclosure.
Figure 3:
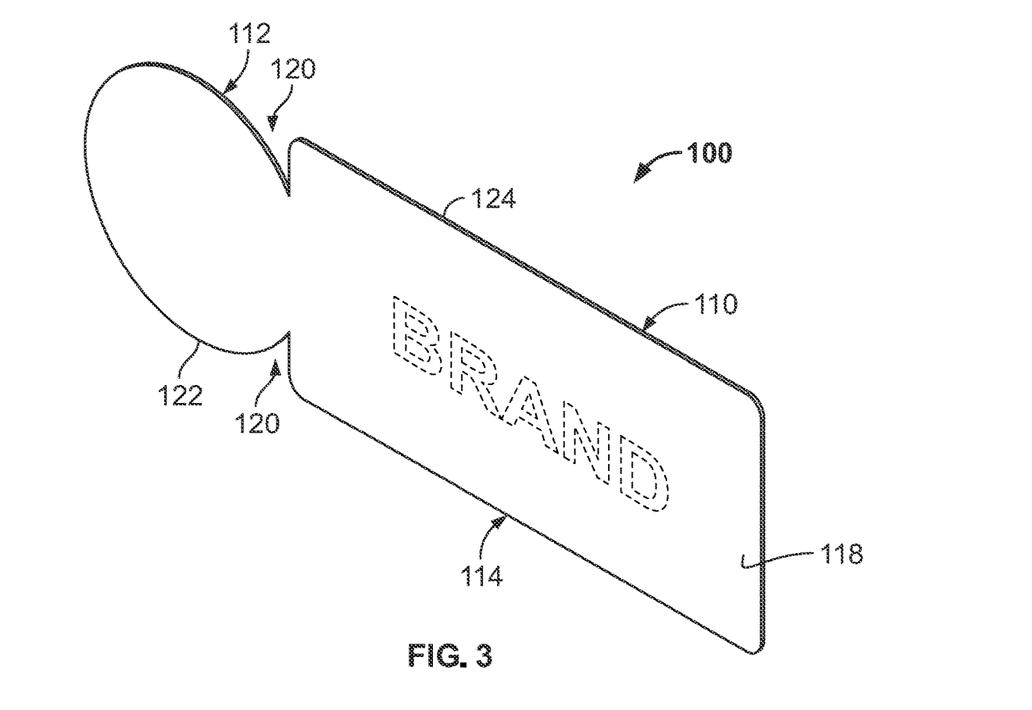
FIG. 3 is a perspective view of an embodiment of a colored light filtration apparatus sized differently than the colored light filtration apparatus of FIG. 1 in accordance with the present disclosure.
Figure 4:
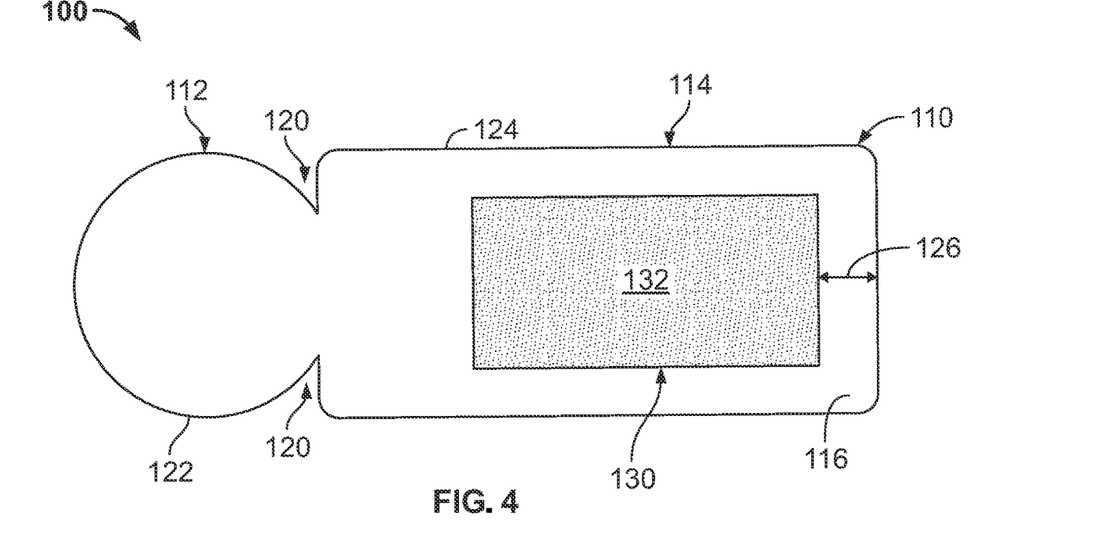
FIG. 4 is a bottom plan view of the colored light filtration apparatus of FIG. 1 in accordance with the present disclosure.
Figure 5:
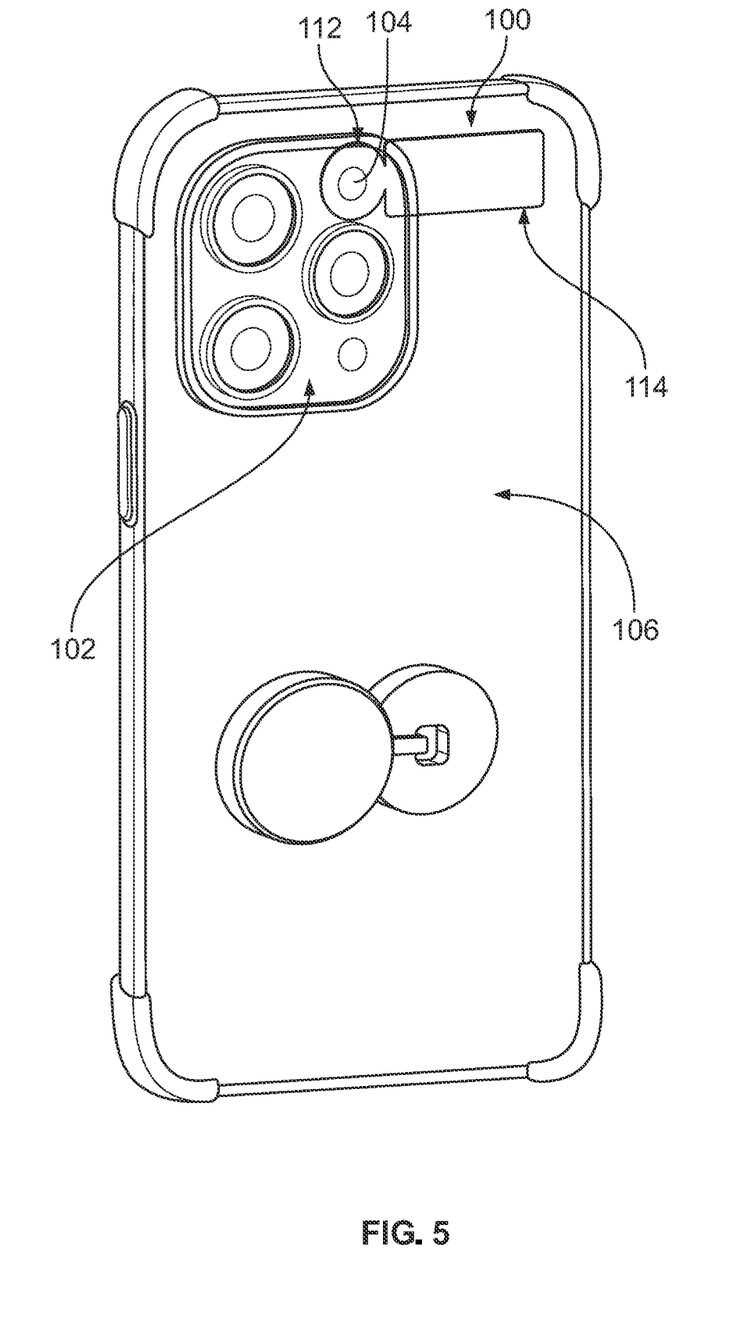
FIG. 5 is a perspective view of the colored light filtration apparatus of FIG. 1 positioned on an embodiment of a cell phone in accordance with the present disclosure.
Figure 6:
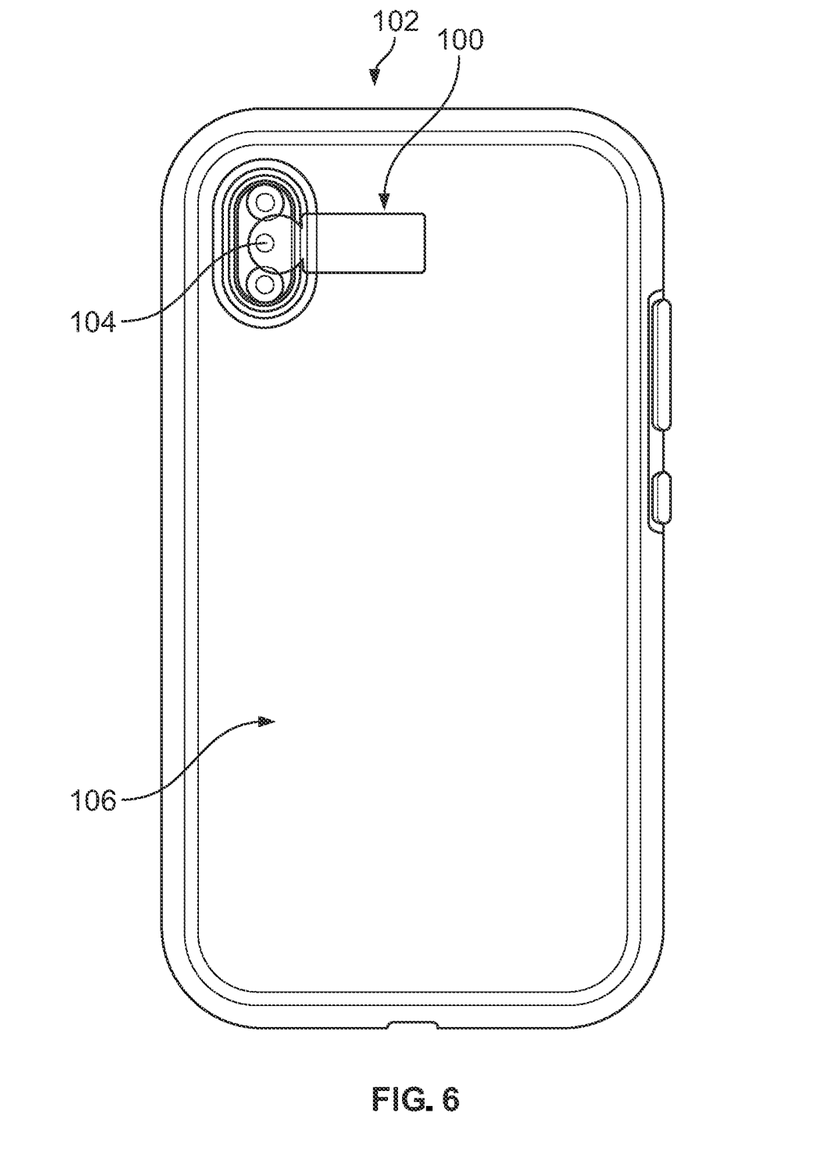
FIG. 6 is a top plan view of the colored light filtration apparatus of FIG. 1 positioned on an embodiment of a cell phone in accordance with the present disclosure.
Figure 7:
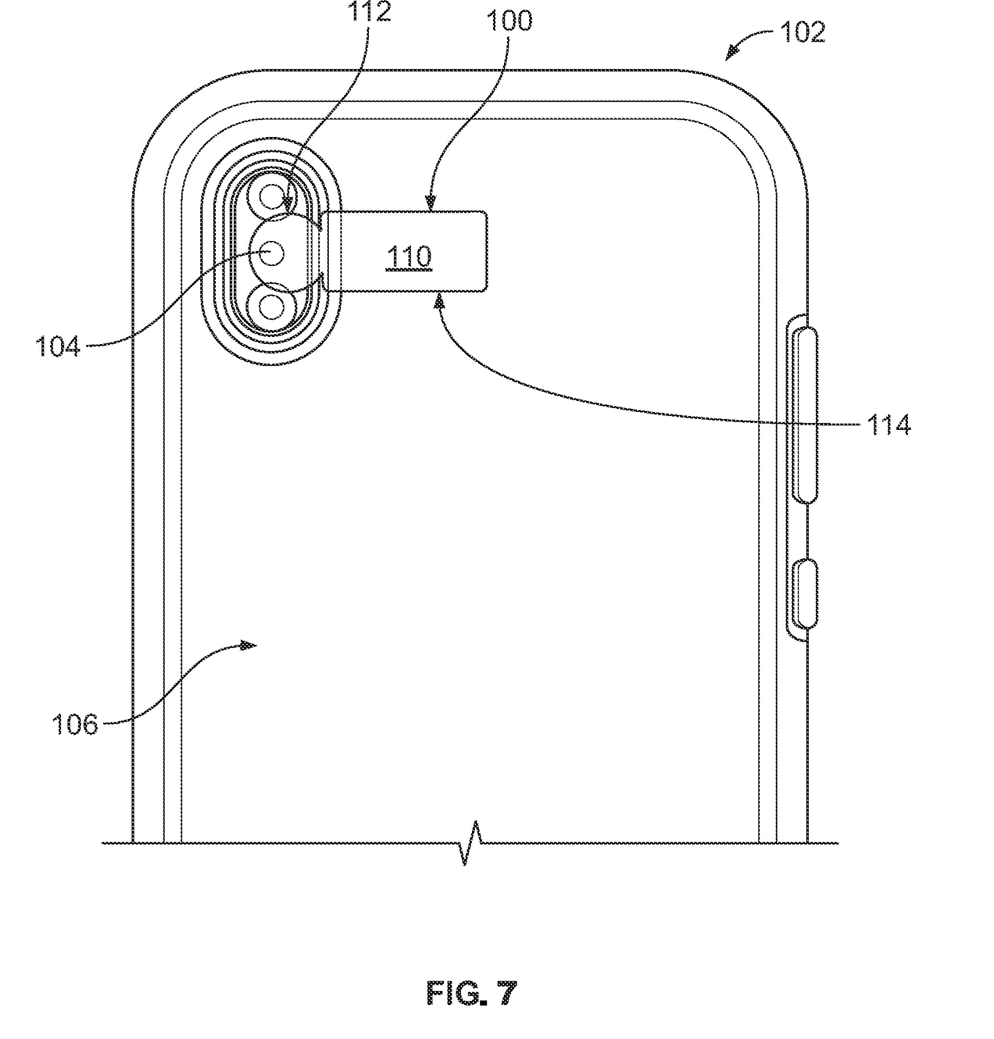
FIG. 7 is an enlarged top plan view of the colored light filtration apparatus of FIG. 1 positioned on the cell phone of FIG. 6 in accordance with the present disclosure.
Figure 8:
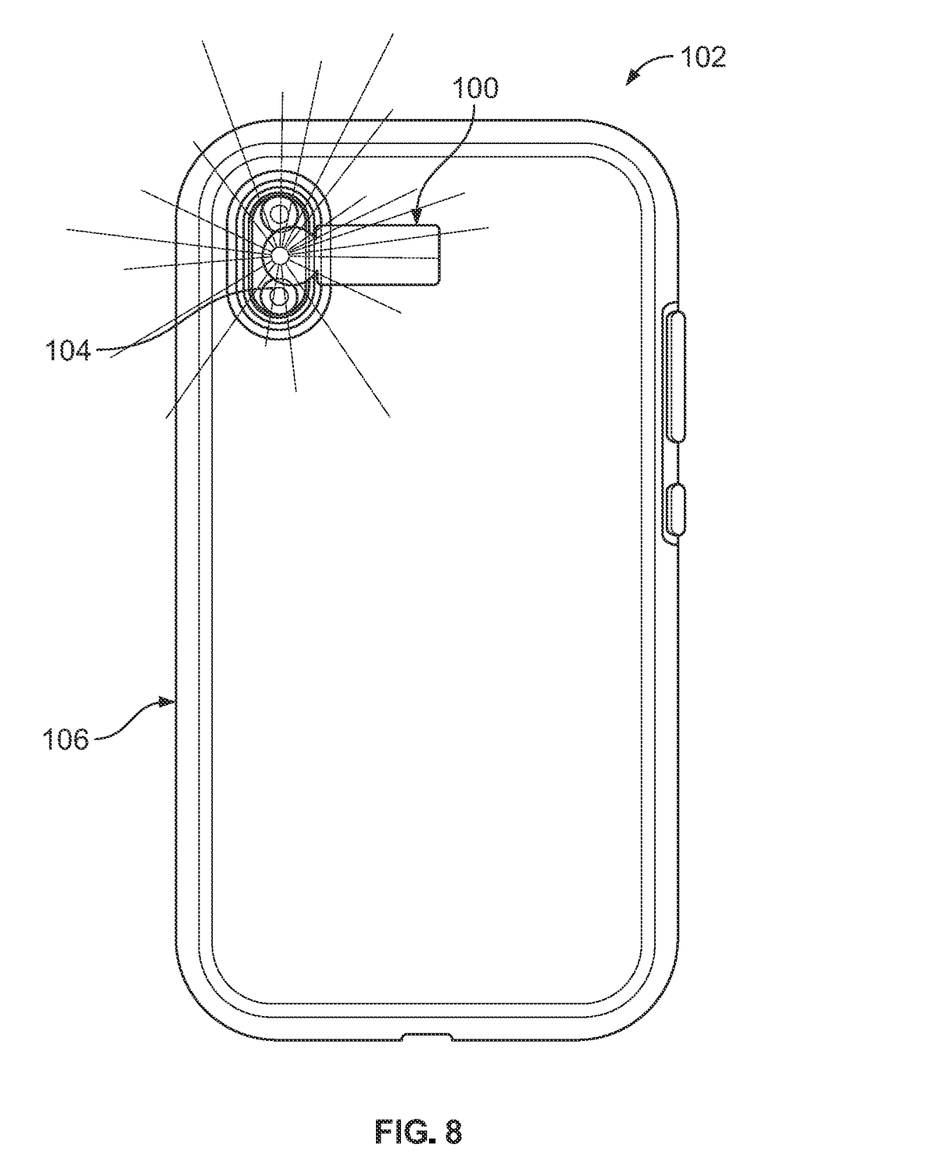
FIG. 8 is a perspective view of the colored light filtration apparatus of FIG. 1 positioned on the cell phone of FIG. 6 with a light source of the cell phone activated in accordance with the present disclosure.

Referring to FIGS. 2 and 4, the coupling means 130 may be connected to the second portion 114 of the colored translucent film 110. The coupling means 130 may be configured to releasably couple the second portion 114 of the colored translucent film 110 to one of the cell phone 102 or the case 106 of the cell phone 102, or both. The coupling means 130 may be a reusable adhesive 132 deposited on at least a portion of a bottom surface 116 of the second portion 114 of the colored translucent film 110. The reusable adhesive 132 may be any type of releasable adhesive, such as, for example, a pressure sensitive adhesive, a polymer-based adhesive, or the like. The reusable adhesive 132 may further be a paste, a liquid, a film, and a supported film type of adhesive. The certain optional embodiments, the coupling means 130 may be a non-reusable adhesive.

A distal portion 126 of the bottom surface 116 of the second portion 114 of the colored translucent film 110 may be free from the coupling means 130 in order to allow easy removal of the apparatus 100 from the user's cell phone 102. The distal portion 126 may allow a user's fingernail to easily slide under the bottom surface 116 for removing the apparatus 100 from the user's cell phone 102.

In another embodiment, the coupling means 130 may be connected to the first portion 112 of the colored transparent film 110. The coupling means 130 may be deposited around an outer periphery of the bottom surface 116 of the first portion 112 so that a central area of the first portion 112 that does not include the coupling means 130 covers the light source 104. The coupling means 130 may be of the same or similar material as the coupling means 130 discussed above. The bottom surface 116 of the second portion 114 does not include coupling means 130 to allow a user to manipulate the second portion 114 to position, place, and eventually remove the apparatus 100 from the user's cell phone 102 or case 106 of the cell phone. In this embodiment, the first portion 112 may releasably couple to one of the cell phone 102 or the case 106 of the cell phone 102.

In another embodiment where the coupling means 130 is connected to the first portion 112 of the colored transparent film 110 as discussed above, a perforation line may be disposed between the first portion 112 and the second portion 114 spanning across the width of the colored transparent film 110. In this embodiment, a user may manipulate the second portion 114 to position and place the apparatus 100 to the user's cell phone 102 or case 106 of the cell phone, and the second portion 114 may be separated from the first portion 112 that is coupled to the user's cell phone 102 or case 106 of the cell phone. In this manner, only a first portion 112 of the colored translucent film 110 is coupled to the user's cell phone 103 or case 106 of the cell phone and presents a clean and aesthetically pleasing appearance.

In another embodiment, the coupling means 130 may be deposited both around an outer periphery of the bottom surface 116 of the first portion 112 and on at least a portion of the bottom surface 116 of the second portion 114 as discussed above wherein the distal portion 126 of the bottom surface 116 of the second portion 114 of the colored translucent film 110 may be free from the coupling means 130 in order to allow easy removal of the apparatus 100 from the user's cell phone 102 and/or the case 106 of the cell phone 102. In this embodiment, both the first portion 112 and the second portion 114 may releasably couple to either or both of the cell phone 102 and the case 106 of the cell phone 102.

The colored translucent film 110 may further include indentations 120 defined between the first portion 112 and the second portion 114. The first portion 112 may include a circular shape 122 and the second portion 114 may include a squaroid shape 124 (e.g., a square, rectangle, or the like). The indentations 120 may be shaped to match a shape 122 of the first portion 112 of the colored translucent film 110. The first portion 112 may be shaped similar to a lens of the light source 104, however, the size of the first portion 112 may be larger than the lens, such that the first portion 112 covers the light source 104 even when not perfectly aligned therewith. The shape of each of the first portion 112 and the second portion 114 may be different in other optional embodiments. In other embodiments, the shape of the first portion 112 may be formed to accommodate the lens of the light source 104 of a cell phone 102, including shapes such as a circle, semicircle, oval, ellipse, square, rectangle, or any shape generally conforming with the lens of the light source 104 of a cell phone 102.

The apparatus 100 may further include customizable branding 140 disposed on at least a portion of a top surface 118 of the second portion 114 of the colored translucent film 110. The customizable branding 140 may include at least one of a logo, type-script, or the like, which may generally be associated with company logos, names, or brands. The customizable branding 140 may be printed on, inscribed in, or raised from the top surface 118 of the second portion 114 of the colored translucent film 110.

Referring to FIGS. 1-4, the colored translucent film 110 may be shaped or sized differently for different types of cell phones 102. The first portion 112 of the colored translucent film 110 may be narrow enough to prevent disruption with surrounding cameras and/or cases 106 of the cell phone 102.

In an exemplary embodiment, the apparatus may be dimensioned with a total length of about to about $$1\frac{1}{8}''$$

and a width to about $$1\frac{1}{2}'',$$

to about $$\frac{1}{4}''$$

to about $$\frac{1}{2}'',$$

with the first portion 112 comprising about 20% to about 50% of the total length and the second portion 114 comprising about 50% to about 80% of the total length. In an exemplary embodiment, the first portion 112 may of a circular shape be dimensioned with a radius ranging from about $$\frac{1}{8}''$$

to about $$\frac{1}{4}''.$$

The colored translucent film 110 may be made from optically clear gloss vinyl, one or more polymer substrates—including dye impregnated polycarbonate compositions, or the like. This material makes the colored translucent film 110 easy to peel and temporarily stick onto the light source 104 of all cell phones 102 with easy removal. The colored translucent film 110 may also be moldable for conforming to a surface shape of the cell phone 102 or the case 106 of the cell phone 102. Materials available to form the colored translucent film include the following list, where each material is chosen for desired characteristics, including hardness, scratch resistance, transparency, etc.: acrylic, epoxy polyamide, polycarbonate, polyester, co-polyester (PETG, PCTG), polyethylene, polyolefin, polypropylene, polystyrene, polysulfone, polyurethane, polyvinyl chloride, styrene acrylonitrile.

In some embodiments, a first section of the film 110 may be translucent and a second section of the film may be opaque or semitranslucent. In certain embodiments, the first portion 112 may be translucent and the second portion 112 may be opaque. In other embodiments, the first portion 112 may be translucent and the second portion 112 may be semitranslucent.

The colors of the colored translucent film 110 are limitless and can be matched exactly to logo colors for companies and brands (e.g., the customizable branding 140). The colored translucent film 110 may comprise light-modulating properties such that a peak intensity of absorbed light falls at any point within the range of 200 nm to 3000 nm, or only within the visible spectrum of 400 nm to 700 nm. The colored translucent film 110 may additionally comprise light-modulating properties such that absorbed light occurs across a broad spectrum of light within the ranges discussed above or at a specific wavelength within the ranges discussed above.

The colored translucent film 110 may be comprised of a single color, or may be multi-colored. In one embodiment, the first portion 112 is a first color and the second portion 114 is a second color. In some embodiments, the second portion 114 may be comprised of two or more colors. In yet another embodiment, one portion of the film may not be colored, or may be transparent.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An apparatus for a light source of a cell phone, the apparatus comprising:
   a colored translucent film including a first portion configured to cover the light source and a second portion configured to be coupled to the cell phone or a case of the cell phone adjacent to the light source such that the first portion covers the light source;
   a coupling means connected to the first portion, the second portion, or a combination thereof, the coupling means configured to releasably couple the first portion, the second portion, or a combination thereof to one or both of the cell phone or the case of the cell phone; and
   wherein a perforation line is disposed between the first portion and the second portion.

2. The apparatus of claim 1, wherein:
   the coupling means is a reusable adhesive deposited on at least a portion of a bottom surface of the second portion of the colored translucent film.

3. The apparatus of claim 1, wherein:
   the coupling means is a reusable adhesive deposited around a periphery of a bottom surface of the first portion of the colored translucent film.

4. The apparatus of claim 1, wherein
   the first portion of the colored translucent film includes a circular shape; and
   the second portion of the colored translucent film includes a squaroid shape.

5. The apparatus of claim 1, the colored translucent film further comprising:
   a sidewall disposed perpendicular a bottom surface;
   wherein the bottom surface comprises the coupling means; and
   wherein the sidewall of the colored translucent film includes indentations positioned between the first portion and the second portion.

6. The apparatus of claim 5, wherein:
   the indentations are shaped in accordance with a shape of the first portion of the colored translucent film.

7. The apparatus of claim 1, wherein:
   the colored translucent film is moldable for conforming to a surface of the cell phone or the case of the cell phone.

8. The apparatus of claim 1, further comprising:
   customizable branding disposed on at least a portion of a top surface of the second portion of the colored translucent film.

9. The apparatus of claim 8, wherein:
   the customizable branding includes at least one of a logo or a type-script.

10. An apparatus for a light source of a cell phone, the apparatus comprising:
    a colored translucent film including a first portion configured to cover the light source and a second portion configured to be coupled to the cell phone or a case of the cell phone adjacent to the light source such that the first portion covers the light source;
    a coupling means connected to the first portion, the second portion, or a combination thereof, the coupling means configured to releasably couple the first portion, the second portion, or a combination thereof to one or both of the cell phone or the case of the cell phone;
    wherein the first portion of the colored translucent film includes a circular shape and the second portion of the colored translucent film includes a squaroid shape.

11. The apparatus of claim 10, wherein:
    the coupling means is a reusable adhesive deposited on at least a portion of a bottom surface of the second portion of the colored translucent film.

12. The apparatus of claim 10, wherein:
    the coupling means is a reusable adhesive deposited around a periphery of a bottom surface of the first portion of the colored translucent film.

13. The apparatus of claim 10, wherein:
    a perforation line is disposed between the first portion and the second portion.

14. The apparatus of claim 10, the colored translucent film further comprising:
    a sidewall disposed perpendicular a bottom surface;
    wherein the bottom surface comprises the coupling means; and
    wherein the sidewall of the colored translucent film includes indentations positioned between the first portion and the second portion.

15. The apparatus of claim 14, wherein:
    the indentations are shaped in accordance with a shape of the first portion of the colored translucent film.

16. The apparatus of claim 10, wherein:
    the colored translucent film is moldable for conforming to a surface of the cell phone or the case of the cell phone.

17. The apparatus of claim 10, further comprising:
    customizable branding disposed on at least a portion of a top surface of the second portion of the colored translucent film.

18. The apparatus of claim 17, wherein:
    the customizable branding includes at least one of a logo or a type-script.

* * * * *